Feb. 13, 1945.  B. PHILLIPS  2,369,603
LIFTING JACK
Filed Feb. 2, 1944

INVENTOR.
Benjamin Phillips
BY
Zugelter & Zugelter
Attys.

Patented Feb. 13, 1945

2,369,603

UNITED STATES PATENT OFFICE 2,369,603

LIFTING JACK

Benjamin Phillips, Cincinnati, Ohio, assignor to Phillips Pump & Tank Company, Cincinnati, Ohio, a corporation of Ohio Application February 2, 1944, Serial No. 520,769

9 Claims. (Cl. 214—65)

This invention relates to a lifting jack, and is concerned primarily with an improvement in such equipment designed to expedite and facilitate the lifting of aircraft or other vehicles at their wheels. The jack herein disclosed includes a pair of opposed shoes to be forced beneath the tire of a wheel to the extent necessary for supporting the wheel and lifting it, while attached to the vehicle, to an elevation above ground level.

One of the objects of the invention is to provide a lifting jack of the character referred to, which includes means in the form of opposed shoes so constructed as to avoid pinching or mutilating the vehicle tire as the shoes are projected beneath the tire to lifting position.

Another object is to include in the shoe construction, means for reducing to a minimum the effort and time required to properly place the shoes and lift the wheel above ground level.

The foregoing and other objects are attained by the means described herein and disclosed in the accompanying drawing, in which.

Jacks of the character herein referred to are useful for various purposes, one of which is the lifting of aircraft tail wheels to an elevation above ground level, for leveling the grounded aircraft to approximate flight position. This leveling of the aircraft while on the ground or runway, is generally resorted to for the purpose of checking and adjusting the accuracy of the gunnery of the aircraft, as well as such other equipment as may be beneficially checked, adjusted or installed with the aircraft in flight position.

In lifting the tail of an airplane for the purpose specified, it is desirable to apply the lifting force to the tire of the tail wheel. The tires are generally of the pneumatic type, and are fabricated from rubber or rubber-like material, wherefore the forcing of any lifting element or wedge between the tire and the runway is performed always at the risk of pinching or mutilating, or otherwise damaging the tire. The probability of tire damage is effectively eliminated by means of the present invention, while at the same time the performance of the lifting operation is greatly facilitated and expedited to advantage, particularly when the airplane is vulnerable to attack while undergoing servicing of its equipment.

Figure 1:
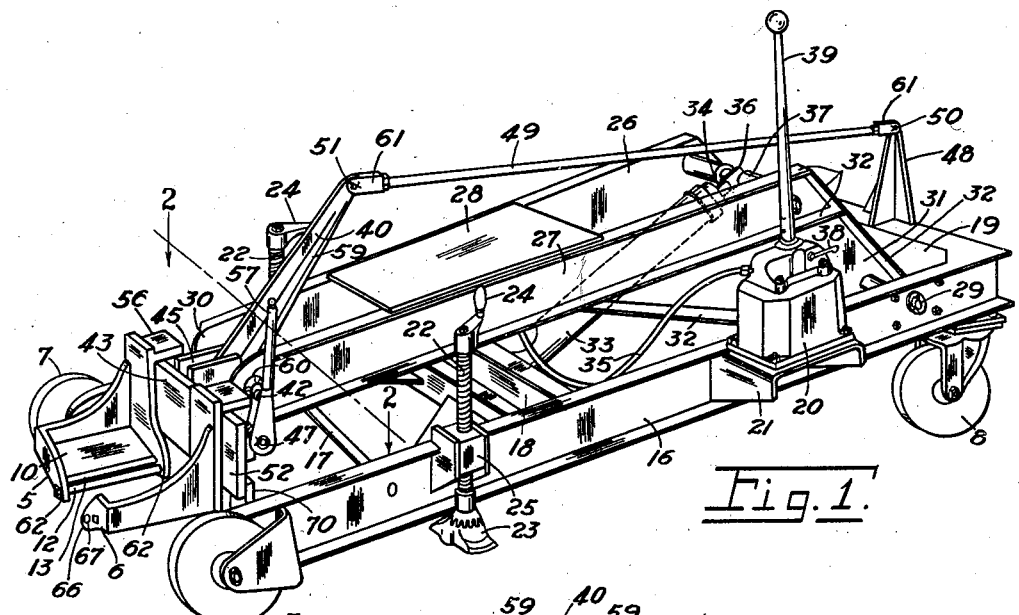
Fig. 1 is a perspective view of a lifting jack incorporating the present invention.
Figure 3:
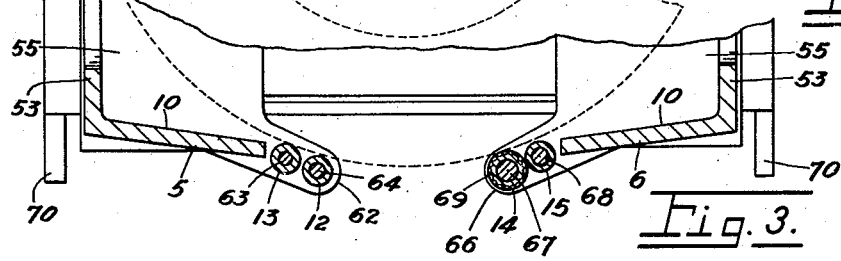
Fig. 3 is an enlarged fragmentary cross-sectional view taken on line 3—3 of Fig. 2.

Referring to the accompanying drawing, Fig. 1 shows the jack with its lifting shoes 5 and 6 in a lowered position, slightly above ground level, so that the jack as a whole may rest upon its pairs of wheels 7 and 8, and be rolled over the ground or the surface of a runway, into position for lifting an aircraft tail wheel. Fig. 3 indicates the relative positions of the shoes while supporting the tire 9 of such a wheel. As is readily apparent, the tire rests upon the shoes with the plane of the tire transverse to the frame of the jack. To dispose the tire upon the supporting areas of the shoes, the toes of the shoes are driven beneath the tire from opposite sides thereof, until the tire leaves the ground or runway and rests upon the upper supporting surfaces or base portions 10 of the shoes. In moving onto the shoes proper, the tire ascends over the rollers 12, 13, 14 and 15, as the shoes are moved toward each other beneath the tire.

In general, the apparatus comprises a wheeled main frame including the side members 16 properly braced by means of cross members such as are indicated at 17, 18 and 19, to maintain a rigid rectangular condition of the frame. At its opposite ends, the frame is supported upon wheels 7 and a pair of swivel casters 8. The main frame carries an hydraulic pump 20 supported upon a bracket 21, the purpose of which will be explained. Near that end of the frame which carries the wheels 7, the main frame is provided with a pair of leveling screws 22 each including a foot 23 adapted to contact the runway as the screws are rotated by means of handles 24, for the purpose of slightly lifting the wheels 7 and preventing undesirable movement of the apparatus while in use. The screws pass through nuts 25 fixedly mounted upon the frame sides. In addition to preventing rolling of the apparatus, the screws may serve also as leveling means for the main frame.

Upon the main frame is pivotally mounted an elevator constituted of a pair of divergent frame members 26—27, which are maintained in rigid relationship by means of suitable reinforcement including the truss plate 28. The elevator has its pivotal mounting upon a transverse shaft 29 supported by the side members of the main frame, so that the free end 30 of the elevator is movable arcuately to raised and lowered positions as it moves about the shaft 29. It is to be understood that the triangular extension member 31 constitutes a fixed or rigid part of the elevator frame 26—27. The principal parts, such as the frame members 26—27—31 of the elevator preferably are flanged as at 32 to impart the necessary strength thereto.

Means are provided for power elevating and lowering of the elevator, which in the present instance includes a hydraulic cylinder 33 having the usual piston and piston rod 34 to be extended and retracted by fluid pressure generated in pump 20 and communicated to the cylinder by means of a hose or pipe connection 35. The outer end 36 of the piston rod acts upon a stationary part of the elevator, for example the cross-shaft 37, to effect pivotal movement of the elevator frame about the supporting shaft 29. The lower end of the hydraulic cylinder 33 is pivotally mounted upon the cross piece 18 of the main frame, in a manner well known.

From the foregoing, it will be understood that by properly setting the control valve lever 38 of the hydraulic pump, and manipulating the pump handle 39, the necessary fluid pressure is generated for extending or retracting piston rod 34, to raise or lower the free end 30 of the elevator.

The free end of the elevator carries the lifting shoe assembly illustrated at the left of Fig. 1. This assembly comprises a lever 40 having a hub or boss 41 through which extends the shaft 42 that forms the pivotal mounting for the shoe assembly. A transverse rail or slide 43 is rigidly associated with the lower end of lever 40, and may be welded or otherwise suitably fixed thereto. The rail may be braced upon the lever by means of a suitable triangular gusset 44 which establishes the desired rigidity. At the connection between the lever and the rail, a bracket 45 may be provided, serving to mount a bearing 46 for the right and left hand screw shaft 47. This shaft may be rotated in opposite directions for moving the shoes 5 and 6 relatively toward and from one another.

The shoe assembly lever 40 constitutes part of a stabilizing means provided for the purpose of maintaining a horizontal condition of the lifting shoes at all elevated positions of the elevator. The stabilizing means includes the lever 40, a fixed upstanding post 48 at the swivel end of the main frame and a stabilizer rod 49. One end of rod 49 has a pivotal mounting upon the top of post 48 at the elevation 50, whereas the opposite end thereof is pivotally connected at 51 to the free end of the pivoted lever 40. The pivots 50, 51, 42 and 29 form a pantograph arrangement of the parts, or a pivotal parallelogram, operating in all raised and lowered positions of the elevator to maintain the shoes 5 and 6 in a horizontal condition, the guide rail 43 meanwhile maintaining always a vertical disposition of the bearing wall 52 for the shoes.

Figure 2:
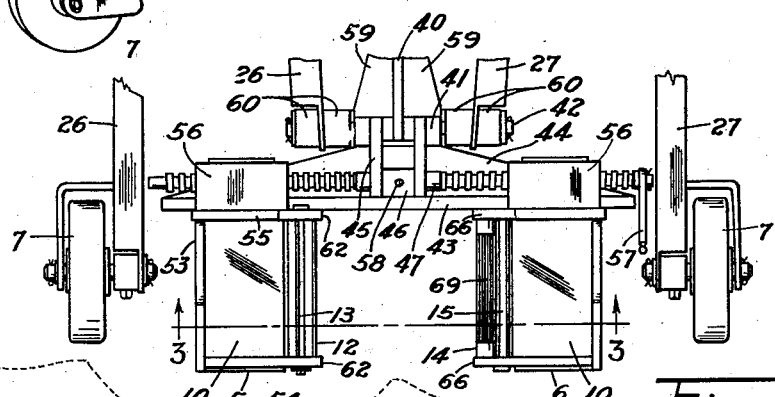
Fig. 2 is a fragmental plan view taken on line 2—2 of Fig. 1.

As illustrated by Fig. 2, each of the shoes 5 and 6 is constituted of an inclined bottom wall 10, a rear wall or heel portion 53, and a pair of side walls 54 and 55, the latter serving as a thrust plate operative against the face of rail 43 to support the shoes as shown. At the upper end of each shoe, and reaching over the top of rail 43, is a fixed bracket 56 which carries a nut fitting the threads of screw 47, so that rotation of the screw by means of a suitable wrench or handle 57 will effect shifting of the shoes in opposite directions along the rail. The screw actuator 57 preferably includes a ratchet arrangement with reversing means built therein, so that the screw may be rotated without the need for moving the actuator 57 through a full circle of movement.

As will be understood, the screw is rotatably mounted within the bearing 46, and may be held against longitudinal shifting movement in any suitable manner, such as by means of a pin or other limiting means indicated at 58. One end of the screw carries a left hand thread, and the other carries a right hand thread, received in the correspondingly threaded nuts located within the bracket structures 56 of the opposed shoes. Lever 40 may be flanged as at 59 to impart the necessary strength thereto, and the frame members 26—27 of Fig. 2 may carry proper bearings 60 for the shaft 42. Stabilizer rod 49 is by preference provided with suitable clevises 61, whereby the angularity of lever 40 may be adjusted when necessary.

With reference to the shoes 5 and 6, it may be noted that the bottom or base portions 10 thereof slope inwardly and downwardly toward one another, and that each has a heel portion furnished by the rear wall 53, said heel portion serving as a reinforcement for the inclined bottom or base of each shoe. The toe portion of shoe 5 includes an extending bracket 62, likewise inclined, said bracket carrying a pair of spaced parallel shafts 63 and 64 upon which are rotatably mounted the rollers 13 and 12, respectively. The rollers extend in parallelism with the inclined bottom or base 10, and reach from one side wall to the other, of the shoe. The side walls are indicated at 54 and 55 of Fig. 2. The opposed brackets 62, together with the rollers and their shafts 63 and 64, constitute the leading toe portion of the shoe, and the freely rotatable rollers provide for substantially frictionless entry of the toe portion beneath the tire 9 of the airplane wheel as the shoe is advanced toward the opposite shoe.

The opposite shoe 6 carries opposed bracket means 66 supporting the roller shafts 67 and 68, upon which are mounted for rotational movement the rollers indicated at 14 and 15. Roller 15 is preferably of the same dimension as rollers 12 and 13, but roller 14, which is ahead of roller 15, is of larger diameter than any of the other rollers. Roller 14 may be considered a pilot roller, since its primary function is to gently grip the tire and boost it onto rollers 12 and 13 of the opposite shoe 5. To aid the gripping and boosting action of the pilot roller, said roller preferably is fluted or otherwise roughened as indicated at 69.

The operation of the lifting jack is as follows.

Assuming that the guns of any given airplane are to be tested or adjusted while the plane is grounded, the lifting jack of Fig. 1 is rolled toward the tail wheel of the airplane, with the longitudinal axis of the machine disposed perpendicularly to the plane of the wheel. The elevator is disposed to its extreme lower limit of movement, and the shoes are separated to the extent necessary for disposing them at opposite sides of the tire, by actuating the lever 57 which rotates the shoe adjusting screw 47. With the shoes disposed at opposite sides of the tire, and at ground level, the operator proceeds to manipulate the actuating lever 57 for advancing the leading toe portions of the shoes beneath the tail wheel tire. Continued advancement of the shoes causes the fluted or roughened pilot roller 14 to boost the tire onto the rollers 12 and 13, thereby lifting the tire slightly and causing it to progressively advance onto the base portions 10 of the shoes. As soon as the tire and wheel are supported fully upon the areas 10, the operator may proceed to actuate the hydraulic pump 20 for raising the elevator about its pivotal shaft 29, with the result that the tail of the airplane is lifted to the desired elevation. To preclude accidental and unintentional movement of the lifting jack, the leveling screws 22 should then be advanced until the feet 23 thereof firmly contact the ground or runway surface. This completes the operation of elevating the tail of the airplane.

Upon completion of such servicing as the airplane may require, the tail wheel may be lowered by reversing the procedure outlined above. That is, the leveling screws 22 first are retracted until the feet thereof leave the ground or runway surface, and thereafter the hydraulic pump may be actuated to relieve the fluid pressure within cylinder 33 at a slow rate, to effect lowering of the elevator and the shoe assembly by gravity. Upon reaching ground level, the shoes may be retracted or moved apart in opposite directions by means of the reversible ratchet lever 59, until the tire of the tail wheel rests upon the runway. The entire device then may be withdrawn from proximity with the airplane, by simply rolling it to another location.

If desired, the shoe assembly may be provided with suitable depending stops 70 to limit descent of the shoe assembly toward ground level. These stops may be in the form of posts or uprights rigidly mounted upon the rail 43 that supports the sliding shoes.

As will be understood, the device of the invention is susceptible to various modifications and changes in structural details, without departing from the spirit of the invention as set forth in the claims appended hereto. Such changes and substitutions as are within the skill of the engineer or skilled mechanic, therefore, are intended to be embraced by the claim terminology in the absence of express limitations to the contrary appearing thereon.

What is claimed is:

1. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion, and antifriction means at said toe portions to facilitate projecting the shoes beneath the wheel of a stationary vehicle for ultimate disposition of the wheel upon the bases of the shoes.

2. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion disposable substantially to ground level, and roller means extending across the toe portions of the shoes ahead of the shoe bases, for initially contacting a wheel to be lifted onto the shoe bases as the shoes are moved toward each other substantially at ground level.

3. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion disposable substantially to ground level, and roller means extending across the toe portions of the shoes ahead of the shoe bases, for initially contacting a wheel to be lifted onto the shoe bases as the shoes are moved toward each other substantially at ground level, the roller means of one shoe being of greater diameter than the roller means of the other shoe.

4. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion disposable substantially to ground level, and roller means extending across the toe portions of the shoes ahead of the shoe bases, for initially contacting a wheel to be lifted onto the shoe bases as the shoes are moved toward each other substantially at ground level, the roller means of one shoe having a roughened wheel-engaging surface of greater area than the roller means of the other shoe.

5. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion disposable substantially to ground level, and roller means extending across the toe portions of the shoes ahead of the shoe bases, for initially contacting a wheel to be lifted onto the shoe bases as the shoes are moved toward each other substantially at ground level, the roller means of only one shoe having a roughened wheel-engaging surface, to urge onto the roller means of the other shoe the wheel to be lifted.

6. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion, a plurality of rollers rotatably supported upon the toe portions of the shoes so as to move in parallelism as the shoes are shifted relatively, said rollers being disposable substantially at ground level in the lowered position of the elevator, the shoe base and rollers of each shoe constituting a platform inclined to ground level.

7. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion, a plurality of rollers rotatably supported upon the toe portions of the shoes so as to move in parallelism as the shoes are shifted relatively, said rollers being disposable substantially at ground level in the lowered position of the elevator, the leading roller of one shoe being enlarged in diameter and surface-roughened, to grip the wheel to be lifted and thereby shift the wheel initially onto the rollers of the remaining shoe.

6. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion, and anti-friction roller means at the toe portion of at least one of said shoes to engage the periphery of a wheel and facilitate boosting the wheel onto the shoe bases as the shoes move toward one another.

9. In a lifting jack of the class described, the combination of a wheeled frame, an elevator mounted upon said frame for movement to elevated and lowered positions, a pair of vehicle wheel engaging shoes carried by the elevator and movable therewith to the elevated and lowered positions, means for shifting the shoes relatively toward and from one another, each shoe including a base and a leading toe portion disposable substantially to ground level, and roller means extending across the toe portion of at least one of the shoes ahead of the shoe base, for initially contacting a wheel to be lifted onto the shoe bases as the shoes are moved toward each other substantially at ground level.

BENJAMIN PHILLIPS.